TEMP. STABILITY OF GI AT 70°C

TEMP. STABILITY OF DEAE-GI AT 70°C

DEAE-GI

INVENTOR:
TIBOR SIPOS
ATTORNEY:

United States Patent Office 3,708,397
Patented Jan. 2, 1973

3,708,397
SYRUP CONVERSION WITH IMMOBILIZED
GLUCOSE ISOMERASE
Tibor Sipos, Murray Hill, N.J., assignor to Baxter
Laboratories, Inc., Morton Grove, Ill.
Filed Dec. 22, 1969, Ser. No. 887,245
Int. Cl. C07g 7/02
U.S. Cl. 195—31 R 2 Claims

ABSTRACT OF THE DISCLOSURE

An immobilized glucose isomerase enzyme composition having improved stability to heat and capable of producing increased conversion of glucose to fructose is prepared by thoroughly admixing glucose isomerase, such as obtained from the fermented growth product of Streptomyces phaechromogenes and Lactobacillus brevis, with basic anionic exchange cellulose in aqueous buffer solution at pH 7–10 and recovering the enzyme complex from the reaction mixture.

---

Figure 1:
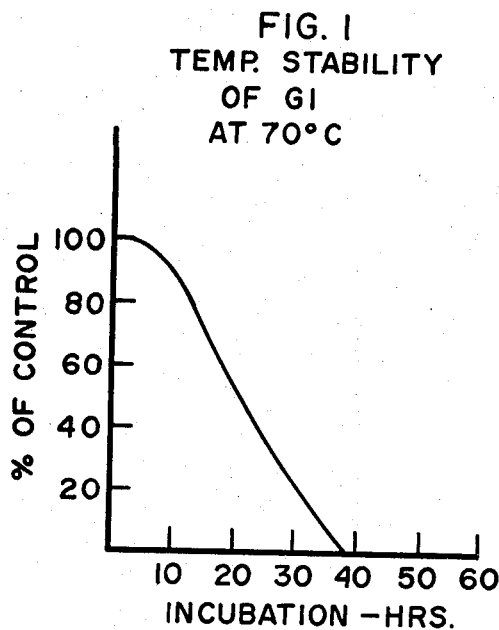

This invention relates to a glucose isomerase enzyme or enzyme preparation and, more particularly, to an immobilized glucose isomerase having improved stability to heat and capable of providing increased conversion of glucose to fructose.

Glucose isomerase is an enzyme or enzyme preparation which catalyzes the conversion of D-glucose to D-fructose. This enzyme has been reported to be produced by numerous microorganisms. Some of these microorganisms are, for example, Aerobacter aerogenes, A. cloacae, Bacillus coagulans, B. megaterium, Brevibacterium pentoaminoacidicum, Escherichia intermedia, Lactobacillus brevis, L. fermenti, L. gayonii, L. lycopersici, L. mannitopoeus, L. pentoaceticcus, Leuconostoc mesenteroides, Paracolobacterium aerogenoides, Pseudomonas hydrophilia, Streptomyces albus, S. bobiliae, S. favovirens, and S. phaechromogenes.

The glucose and fructose compounds involved in the above conversion reaction are closely related monosaccharides, glucose having the aldose structure and fructose being in the ketose form. These simple sugars occur naturally and in the free state in fruits and other parts of plants. They find wide use as sweeteners in confectionaries, culinary mixes and other food products.

Commercially, most glucose is produced by the hydrolysis of cornstarch. Although fructose can be prepared from sucrose by enzymic conversion, it is more economically attractive to produce fructose from glucose, and in the production of certain corn syrup products, a portion of the glucose is normally converted to fructose. The importance of this conversion of glucose to fructose in corn syrup production lies in the fact that fructose not only is substantially sweeter than glucose, but also is very hygroscopic and difficult to crystallize. Therefore, a convenient means for increasing the conversion of glucose to fructose would find much use in commercial practice for the production of corn syrup.

Accordingly, it is an object of this invention to provide an improved glucose isomerase enzyme or enzyme preparation.

It is a further object of this invention to provide an immobilized glucose isomerase having improved stability to heat and capable of providing increased conversion of glucose to fructose.

Other objects and advantages of the present invention will be apparent to those skilled in the art.

The conversion of enzymes into immobilized or insolubilized products possessing specific catalytic activity has been of interest for some time in recent years. In general, these enzyme products have been prepared by various methods, including polymerization onto organic polymer lattices and attachment to polymers of amino acids, coupling to cellulose, dextran and other carbohydrate or polystyrene derivatives, immobilization in starch; and acrylamide gels, and coupling to inorganic carriers such as bentonite, kaolinite and porous glass. These immobilized or insolubilized enzyme products are usually formed through the aid of three general types of reactions: covalent bonding, ionic bonding and physical adsorption. But it has not heretofore been reported that a practical or useful immobilized or insolubilized glucose isomerase can be prepared by any of the foregoing methodology.

In brief, and as more fully described hereinafter, the present invention comprises a glucose isomerase enzyme complex in which the enzyme is bound to a matrix of water-insoluble basic anion-exchange cellulose. Although the inventor is not to be bound by any particular theory, it is believed that the enzyme complex is formed both through ionic bonding and adsorption or entrapment of the enzyme to the water-insoluble matrix.

It has been found that the glucose isomerase enzyme complex of this invention exhibits excellent heat stability and can be used repeatedly (e.g., about 5 to 10 times) before 50% of its enzyme activity is lost at 70° C. In conventional practice by comparison, the unbound, soluble enzyme loses substantially all of its activity in only one conversion. Moreover, it has been found that in the matrix supported form the pH optimum of the glucose isomerase changes to one unit lower and the percent conversion of glucose to fructose substantially increases. In general, from about 12% to about 15% more of the available glucose in syrups can be converted to fructose per conversion by employment of the enzyme complex of this invention instead of the unbound, soluble enzyme. This improved stability to heat and increased yield of glucose conversion represent outstanding advantages of the present invention.

Figure 2:
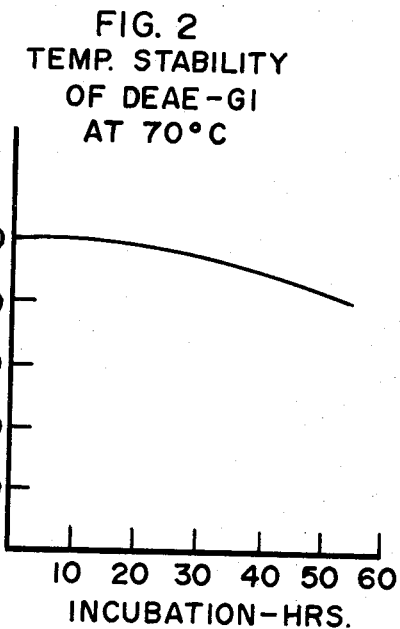
Figure 3:
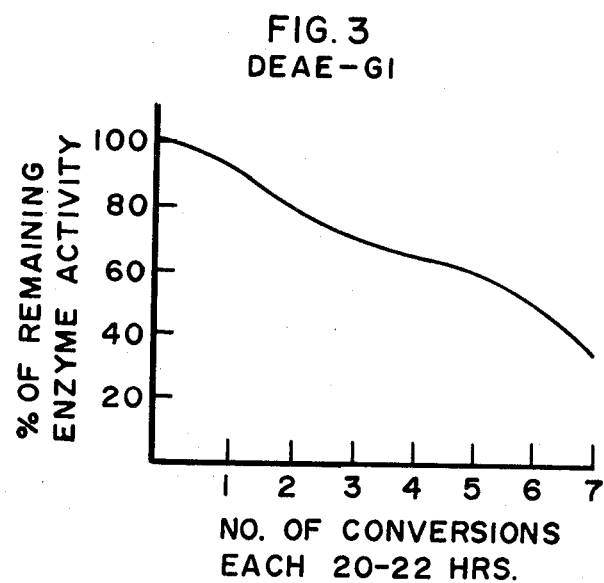

It is believed that a better understanding of the invention can be had by reference to the accompanying drawings. In these drawings, FIGS. 1 and 2 show the heat or temperature stability of the unbound, soluble glucose isomerase and the immobilized glucose isomerase enzyme complex, respectively, at 70° C. FIG. 3 shows the gradual loss of enzyme activity after repeated glucose conversions with the immobilized glucose isomerase enzyme complex.

The preparation of immobilized or insolubilized enzymes by reaction with carbohydrate derivatives such as ion exchange cellulose and cross-linked dextran has been reported previously. Thus, the binding of various plant and animal enzymes such as papain, ficin, trypsin, chymoreaction with carbohydrate derivatives suih as ion-exrhange celluloses and sross-linked dextran has been reported previously. Thus, the binding of various plant and animal enzymes such as papain, finin, trypsin, chymotrypsin, carboxypeptidase, catalase, and ribonuclease to carboxymethyl cellulose (CM-cellulose), diazobenzylcellulose and the like cellulose derivatives is described by Michael and Evers, Makromol. Chem. 3, 200 (1949), Mitz and Summaria, Nature 189, 576–7 (1961), Weliky and Weetall, Immunochemistry 2, 293–322 (1965), Hornby and Lilly, Biochem. J. 107, 669–70 (1968), Manecke, Proceedings of the Biochemical Society, 2P–3P (1968), and in U.S. Pat. 3,126,324; binding of microbial enzymes such as Aspergillus and Bacillus enzyme preparations to diethylaminoethyl and other aminoethylated celluloses is described by Tosa et al., Enzymologia 31, 214–22 (1966), Boyer and Bruce, Arch. Biochem. Biophys. 128, 442–55 (1968), and in British Pat. 1,108,-533; the binding of plant, animal and microbial enzymes such as papain, ficin, ribonuclease, lysozyme, trypsin, chymotrypsin, bovine serum albumin and beta-amylase to cross linked dextran ("Sephadex") gel filters is described by Glazer and Wellner, Nature 194, 862–3 (1962), and Axen and Porath, Nature 210, 367–69 (1969).

In the preparation of the immobilized glucose isomerase enzyme of this invention it has been found to be important to use only certain of the foregoing types of carbohydrate derivatives, namely, the basic anion-exchange celluloses. By the term "basic anion-exchange cellulose" is meant any cellulose containing basic anion-exchange groups bonded to the cellulose molecule and capable of entering into an exchange reaction with anionic groups of other compounds. Preferably, the cellulose is an alpha celluose such as cotton, wood pulp, paper, or cotton cloth. In particular, these anion-exchange cellulose compounds include the di- and tri-ethylaminoethylated celluloses, e.g., DEAE-cellulose and TEAE-cellulose, and the cellulose derivatives of epichlorohydrin and triethanolamine, e.g., ECTEOLA-cellulose.

In the attempt to prepare immobilized or insolubilized glucose isomerase complexes it was found that other carbohydrate or cellulose derivatives, e.g., CM-cellulose, phospho-cellulose, dextran, Sephadex, and DEAE-Sephadex, and various other ion-exchangers such as "Dowex 1–X8" and "Dowex 2–X8," which are also strongly basic anion-exchangers (quaternary ammonium type), do not yield active immobilized or insolubilized glucose isomerase enzyme preparations.

The basic anion-exchange celluloses that can be used in the practice of this invention are known materials which are available commercially or can be prepared by conventional methods such as described, for example, by Peterson and Sober, J. Am. Chem. Soc. 78, 751–55 (1956), and in U.S. Pat. 3,102,113. DEAE-cellulose and ECTEOLA-cellulose are available from the Brown Company, New York, in both coarse and fine fiber having an apparent density (g./ml.) of 0.14 (Type 20) and 0.20 (Type 40). Suitable microgranular and fibrous DEAE-celluloses are available from W. & R. Balston, Ltd., Kent, England, and are known as "Whatman" advanced ion-exchange celluloses. In the preparation of the latter cellulose derivatives, the pure cotton cellulose raw material is modified to increase the degree of molecular orientation prior to introduction of the ion-exchange groups or by chemicallymodifying the pure cotton cellulose during incorporation of the ion-exchange functional groups into the cellulose structure. Examples of such materials are "Whatman" microgranular DE23 and DE52 (preswollen)diethylaminoethyl celluloses. Still other suitable DEAE-, TEAE-, and ECTEOLA-cellulose exchange materials are available from Serva Co., Heidelberg, Germany.

It will be understood that although specific basic anion-exchange celluloses are described above, the invention is not limited to those specific examples and other examples will be apparent to those skilled in the art.

Although the glucose isomerase enzyme or enzyme preparation can be obtained from numerous microorganisms, as noted above, for purposes of this invention it is preferable to obtain the enzyme or enzyme preparation from Streptomyces and Lactobacillus species, and most preferably, from *Streptomyces phaechromogenes* and *Lactobacillus brevis*. These microorganisms are well known, the Streptomyces being members of the order Actinomycetales and the Lactobacillus belonging to the order Eubacterialas. In particular, *Streptomyces phaechromogenes* is isolated from soil and described by Conn [*Actinomyces phaechromogenus* (sic)], "N.Y. State Agr. Exp. Sta. Tech. Bull. No. 60," 1917, and by Waksman and Henrici [*Streptomyces phaechromogenus* (sic)] in Bergey's Manual, 6th ed. 1948, at p. 943. *Lactobacillus brevis* is widley distributed in nature, particularly in plant and animal products, but also in soils, and is described by Orla-Jensen (*Betabacterium breve*), "The Lactic Acid Bacteria," 1919, at p. 175, and in Bergey's Manual, 4th ed., 1934, at p. 312.

The preparation of glucose isomerase from (1) Streptomyces species and from (2) lactic acid bacteria also is well known and is described, respectively, by (1) Takasaki, Agr. Biol. Chem., vol. 30, No. 12, pp. 1247–53 (1966), vol. 31, No. 3, pp. 309–13 (1967), and (2) Yamanaka, Agr. Biol. Chem., vol. 25, No. 4, pp. 272–80 (1961), vol. 27, No. 4, pp. 271–78 (1963)

Although most Streptomyces species are D-xylose utilizing organisms, certain strains are known to produce glucose isomerase enzymes by assimilating xylan, which is much less expensive than D-xylose. It is even unnecessary to use pure xylan for the formation of glucose isomerase. Thus, crude materials such as wheat bran, corn cob and corn hull can be directly employed.

Other suitable examples of *Streptomyces phaechromogenes* employing xylose as the carbon source are described by Sato and Tsumura, Agr. Biol. Chem., vol. 29, No. 12, pp. 1129–34 (1965), Japan Patent 17,640 (1966). Enzymic conversion of D-glucose to D-fructose was demonstrated in the cell-free extracts of *Streptomyces phaechromogenes* cultured in the presence of D-xylose. The organism has certain metal requirements; Mg was found to be essential and Co was found to stimulate the reaction.

Still other specific examples of *Streptomyces phaechromogenes* which can be used to prepare the glucose isomerase employed in this invention are three strains on deposit with the Northern Regional Research Laboratories and available to the public under the NRRL code designations B–1131, B–1517 and B–3559. Suitable examples of the preparation of glucose isomerase from these strains is described by Strandberg, Bacteriology Proceedings, p. 18, A117 (1969). In this preparation, the enzyme was disrupted by sonic treatment and partially purified by ammonium sulfate fractionation, followed by dialysis and lyophilization.

The lactic acid bacteria and *Lactobacillus brevis*, in particular, also generally utilize xylose for the production of glucose isomerase. In these organisms, D-glucose isomerizing activity usually accompanies D-xylose isomerase production. Yamanaka, Biochim. Biophys. Acta 151, 670–80 (1968). These organisms also are known to have certain metal ion requirements for production of glucose isomerase, notably $Mg^{++}$, $Co^{++}$, $Mn^{++}$ and $K^+$.

Another suitable example of *Lactobacillus brevis* is the strain available from the Institute for Fermentation, Osaka, Japan, designated 3960 and described by Yamanaka, ibid.

It will be understood that the glucose isomerase enzyme used in this invention can comprise highly purified materials or more crude enzyme preparations containing other substances normally occurring in the metabolic products of the source microorganisms, for example, dextranase type enzymes. The glucose isomerase enzyme can also be purified by any conventional purification procedure for proteins or enzymes, for example, fractional precipitation with ammonium sulfate, sodium sulfate and other mineral salts, selective adsorption and elution on calcium phosphate and the like gels, differential heat inactivation of contaminating proteins by exposure of the growth product to increasing temperatures at varying pH's, isoelectric precipitation, organic solvent precipitation with acetone, methanol and the like solvents, DEAE-cellulose chromatography and "Sephadex" gel filtration purification procedures, electrophoretic and ultracentrifuge separations.

It will be appreciated that in view of the wide range of purity of the glucose isomerase enzyme or enzyme preparation which can be used in the enzyme complex of the invention, the proportions of the enzyme and the basic anion-exchange cellulose can also vary within wide limits. In general, however, the ratio of from about one to about 100 and, preferably, about 10 grams of wet DEAE-cellulose (equivalent to 4 grams dry) for every- 1,000 G.I. (glucose isomerase) units, or from about one half to about one pound of moist cellulose exchanger for each 100,000 G.I. enzyme units, provides excellent results. The exemplary specific examples set forth below will further illustrate suitable proportions of enzyme in the matrix and additional useful examples will occur to those skilled in the art upon reading this disclosure.

As used herein, the term "glucose isomerase unit" refers to the amount of glucose isomerase enzyme required to produce one mg. of D-fructose during incubation of 0.2 ml. of 1M D-glucose for one hour at 70° C. in 0.5 ml. of 0.2M phosphate buffer solution (pH 7.2) and 0.1 ml. of 1M $MgSO_4 \cdot 7H_2O$ solution according to the assay procedure described by Takasaki, Agr. Biol. Chem., vol. 30, No. 12, p. 1248 (1966).

In order to provide for more efficient production of the immobilized enzyme complex, the starting enzyme material from the fermentation broth is separated from undesirable materials. Thus, the bran or other growth materials can be removed by passing the ferment through a screen, toluene can be added to prevent bacterial growth and to initiate glucose isomerase release into the medium, and the lysed medium can be filtered after addition of filter aid to remove cell debris and insolubles.

In general, the preparation of the immobilized glucose isomerase enzyme complex is achieved by admixing the enzyme or enzyme preparation with the basic anion-exchange cellulose in aqueous buffer at a pH of from about 7 to about 10, and preferably at about pH 8. After thoroughly admixing these components, at normal temperature (ca. 25° C.) or other convenient temperature conditions, the resulting enzyme complex is recovered such as by filtration, centrifugation and the like separation procedures and then preferably washed or sparged with additional buffer. The filtered and washed enzyme complex can be used in its wet form as is, or the cake can be dried by conventional protein or enzyme drying techniques, such as by shelf, rotary drum or spray drying, but preferably, freeze drying.

The immobolized enzyme complex can also be further purified by any of the aforementioned purification techniques described for the starting glucose isomerase enzyme material. A preferred method of purifying the enzyme complex comprises selective gradient elution. Since undesirable constituents of the fermented liquor can also be adsorbed to the cellulose exchanger, a selective elution with buffer containing 0.2 M NaCl to remove these impurities without eluting the enzyme can be employed. Selective elution of the enzyme from the cellulose exchanger can be achieved by resuspending the cake in buffer containing about 0.6 M NaCl and then remixing eluted enzyme, after suitable dilution, with the new exchange cellulose, as before, to reform the enzyme complex.

Suitable buffers for use in the preparation of the immobilized enzyme complex are tris(hydroxymethyl)aminomethane, boric acid-borate, glycinamide and cholamine chloride. A 0.02 M tris buffer, pH 8–8.5, is preferred. Phosphate buffers which might lead to phosphorylation of starch fragments, glucose, or the fructose are preferably avoided in the practice of this invention.

Other metal salts, preferably monovalent metal chlorides, e.g., LiCl or KCl, can be used in place of the NaCl for the selective elution described above.

The following examples will further illustrate the invention described herein although it will be understood that the invention is not limited to these specific examples which are provided only for purposes of illustration and not limitation.

EXAMPLE 1

A 1,000 pound culture growing of *Streptomyces phaechromogenes* is provided by inoculating a medium containing 1% D-xylose, 0.3% $K_2HPO_4$, 0.1% $MgSO_4 \cdot 7H_2O$, 0.02% $CoCl_2 \cdot 6H_2O$, 1% peptone, 3% wheat bran and 2% corn steep liquor, with *Streptomyces phaechromogenes* from an agar slant, and fermenting 48 hours at 30° C. The crude growth product contains 125,000 G.I. units and is worked up to yield a clear supernatant containing 50,000 G.I. units by passing the ferment through a 20 mesh screen to remove residual bran, adding 4% toluene and then 4% "Speedex" filter aid, and filtering. The clear supernatant is buffered with 0.02 M tris buffer, pH 8.5, and then 500 grams of preequilibrated, wet DEAE-cellulose is added. The pH of the medium is reduced to about pH 8.0 by the addition of the cellulose exchanger. After mixing thoroughly by stirring for one hour, the mixture is filtered, the filter cake is sparged with 0.02 M tris buffer, pH 8.0, and the washed cake is retained as the active glucose isomerase enzyme complex. This complex has excellent heat stability and can be used for the conversion of D-glucose to D-fructose with substantially increased conversion compared to the conversion with the unbound, soluble glucose isomerase.

EXAMPLE 2

A glucose isomerase preparation from *Lactobacillus brevis* is substituted for the glucose isomerase preparation from *Streptomyces phaechromogenes* of Example 1 and complexed to DEAE-celluose according to the procedure of that example. A glucose isomerase enzyme complex having excellent heat stability and the ability to provide increased conversion of glucose to fructose substantially similar to that of the glucose isomerase enzyme complex of Example 1 is obtained. In this particular example, the fermentation media contains 0.04%

$MnSO_4 \cdot 4H_2O$, 0.01% $MgSO \cdot 7H_2O$, 0.01% $CoCl_2 \cdot 6H_2O$, 1% D-xylose and 0.1% D-glucose, and incubation is conducted at 37° C. for 24 hours.

EXAMPLE 3

Example 1 is repeated except that an equivalent amount of ECTEOLA-cellulose exchanger instead of DEAE-cellulose exchanger is used for preparation of the immobilized enzyme complex. An immobilized glucose isomerase enzyme product of substantially similar excellent heat stability and ability to convert glucose to fructose is obtained.

EXAMPLE 4

Fermentation of the glucose isomerase preparation according to the procedure of Example 1 was repeated in a pilot plant. After 48 hours of fermentation, 130 pounds of low strength mycelium and bran (from four fermentation tanks) was resuspended in 500 pounds of tap water.

To the mycelium slurry was added:

2 liters tris buffer (182 g.), pH 8.0,
121 g. $MgCl_2$ and 21.3 g. EDTA (pH adjusted to 7.0 before addition),
1 kg. egg white (lysozyme), and
1 liter toluene to inhibit bacterial growth.
The final pH was 7.4.

The mycelium slurry was continuously stirred at 40°–45° C. and samples were removed at the indicated hours for enzyme assay.

| Hours: | Activity GI/ml |
|---|---|
| 0 | 0.725 |
| 21 | 1.08 |
| 45 | 2.42 |
| 69 | 2.57 |

500 g. $MgCl_2$ was added to the lysed slurry and the temperature was brought up to 60° C. to coagulate the lysozyme.

2.5% Speedex was added to the slurry, the slurry was filtered, and the enzyme solution was concentrated by evaporation. The evaporate was clarified by filtration, and the enzyme was precipitated out with cold acetone. Overall yield of the evaporate from the pilot plant was approximately 30%.

The pilot plant evaporate and clarified glucose isomerase was diluted 1:50 fold with distilled water. To the diluted glucose isomerase (1:50) solution, 0.05 M tris buffer, pH 8.5, pre-equilibrated DEAE-cellulose cake (4 g. DEAE/1000 GI units) was added, and stirred for one hour at 4° C. The slurry was filtered and washed with 0.15 M NaCl in 0.05 M tris buffer, pH 8.0, until no more color was eluted. The obtained moist DEAE-GI cake was stored in the freezer and retained for further use.

A comparison between the physical and chemical characteristics of the filtered glucose isomerase preparation (GI) from the above fermentation and the immobilized glucose isomerase enzyme complexed with DEAE-cellulose (DEAE-GI) is set forth in the following table.

TABLE I.—PHYSICAL AND CHEMICAL CHARACTERISTICS OF GLUCOSE ISOMERASE AND DEAE-GLUCOSE ISOMERASE

|  | GI | DEAE-GI |
| --- | --- | --- |
| pH—optimum | 8.5–10 | 7.5–8.5 |
| pH—stability | 5.0–8.0 | 4.5–9.0 |
| Temperature optimum | 80–85° C | 75–85° C |
| Temperature stability at 70° C | 20 hrs. (half life); See FIG. 1 | Stable; See FIG. 2 |
| Metal ion requirement | $Mg^{++}(10^{-2}M)$; $Co^{++}(10^{-3}M)$ | $Mg^{++}(10^{-2}M)$; $Co^{++}(10^{-3}M)$ |
| Conversion of glucose to fructose ratio, percent | 35–40 | 45–50 |
| Loss of enzyme activity after each conversion, percent | 100 | See FIG. 3 |
| Amount of enzyme required to convert 100 g. of glucose to fructose (40%) under optimum conditions (70° C., pH 7.0 and 24 hrs.) | 1,800 units | 1,200 units |

Inspection of Table 1 and FIGS. 1 to 3 reveals the following significant factors concerning the immobilized glucose isomerase enzyme complex:

(1) The pH optimum of the enzyme complex shifted to a lower pH of about 1 unit.

(2) The pH stability is extended in both directions.

(3) The temperature stability is greatly increased.

(4) The conversion of glucose to fructose ratio is greatly increased.

(5) The enzyme complex loses only about 10% to 15% of its activity after each conversion whereas the unbound, soluble glucose isomerase loses all of its activity after only one conversion.

EXAMPLE 5

The unbound, soluble glucose isomerase enzyme preparation and the immobilized glucose isomerase enzyme complex of Example 4 are each used for the conversion of D-glucose to D-fructose by incubation with a 50% corn starch hydrolyzate of 97 D.E. (dextrose equivalent) at 80° C. for 20 hours. The glucose conversion obtained with the enzyme complex is about 15% greater than the conversion obtained with the free glucose isomerase.

Various other examples and modifications of the foregoing examples will be apparent to the person skilled in the art after reading the foregoing specification and the appended claims without departing from the spirit and scope of the invention. Thus, other organisms such as those described hereinbefore can be substituted for the *Streptomyces phaechromogenes* or *Lactobacillus brevis* and other basic anion-exchange celluloses as described above can be substituted for the DEAE- and ECTEOLA-cellulose in the foregoing examples with substantially similar results. All such further examples and modifications of the foregoing examples are included within the scope of the invention as defined in the appended claims.

What is claimed is:

1. A process for the production of an immobilized glucose isomerase enzyme complex having improved stability to heat and capable of producing increased conversion of glucose to fructose over several conversions of extended periods of time comprising reacting a crude glucose isomerase enzyme preparation containing additionally dextranase type enzymes and obtained from the fermented growth product of *Streptomyces phaechromogenes* with a basic anion-exchange resin selected from the group consisting of DEAE-, TEAE-, and ECTEOLA-celluloses by thoroughly admixing in aqueous buffer at pH 7–10 and thereafter separating the enzyme complex from the reaction medium.

2. In the process of converting D-glucose to D-fructose by a glucose isomerase enzyme, the improvement comprising employing as the enzyme the immobilized glucose isomerase enzyme complex prepared by the process of claim 1.

References Cited

UNITED STATES PATENTS 3,126,324  3/1964  Mitz et al. _____ 195—63

OTHER REFERENCES

Takasaki et al., Agr. Biol. Chem. vol. 33, No. 11, pp. 1527–1534 (1969).

Sato et al., Kogyo Kagaku Zasshi (J. Ind. Chem. of Japan) 67, No. 5. pp. 683–687 (1964) Eng. translation only relied on.

Acta Biochimica Sinica, vol. 4, No. 3, June 1964, pp. 342–350.

Mitz et al., Journal of American Chemical Society, vol. 81, July 1959, pp. 4024–4028.

Takasaki et al., Fermentation Advances, pp. 561–589, Academic Press, 1969.

Tsumura et al., Chem. Abst., vol. 69, 64824d (1968), and translation (5 pgs.) of original article in Journal of Food Science and Techology, vol. 14, No. 12, pp. 539–540 (1967).

Kay, Process Biochemistry, August 1968, pp. 36–39.

LIONEL M. SHAPIRO, Primary Examiner

U.S. Cl. X.R.

195—63, 68